United States Patent [19]
Pikoulas

[11] Patent Number: 5,551,315
[45] Date of Patent: Sep. 3, 1996

[54] AUTOMATIC GEAR CHANGING SYSTEM

[76] Inventor: George W. Pikoulas, 105 Ojibwa Dr., Butler, Pa. 16001

[21] Appl. No.: 191,174

[22] Filed: Feb. 3, 1994

[51] Int. Cl.$^6$ ............................. F16C 1/10; B62M 9/00; G06F 15/50; F16H 7/08

[52] U.S. Cl. ............... 74/502.2; 74/500.5; 74/501.5 R; 280/236; 280/238; 364/424.1; 474/70; 474/110

[58] Field of Search .......................... 474/110; 477/121, 477/80, 82; 280/236, 238; 74/500.5, 501.5 R, 625, 502.2; 364/424.1; 192/142 R

[56] References Cited

U.S. PATENT DOCUMENTS

| | | | |
|---|---|---|---|
| 3,919,891 | 11/1975 | Stuhlmuller et al. | 192/142 R |
| 4,041,788 | 8/1977 | Nininger | 280/236 X |
| 4,065,983 | 1/1978 | Mimura | 74/625 |
| 4,143,557 | 3/1979 | Wakebe et al. | 280/236 X |
| 4,490,127 | 12/1984 | Matsumoto et al. | 474/110 |
| 4,605,240 | 8/1986 | Clem et al. | 280/236 |
| 4,795,864 | 1/1989 | Leorat | 477/121 |
| 4,817,471 | 4/1989 | Tury | 477/121 |
| 5,038,627 | 8/1991 | Schwaiger et al. | 477/121 X |
| 5,109,730 | 5/1992 | Zahn et al. | 477/121 |

*Primary Examiner*—Vinh T. Luong
*Attorney, Agent, or Firm*—George C. Atwell

[57] ABSTRACT

An automatic electromechanical gear changing system for automatically derailing the endless chain of a multi-speed bicycle from one rear transmission sprocket to another rear transmission sprocket to effect rear transmission gear shifting. The automatic gear changing system includes a main housing member mounted to a down tube of the bicycle, a handlebar-mounted console which displays various system parameters for the rider (type of program in use by system, speed, gear, battery level, trip miles), and a microprocessor unit disposed within the console for initiating, controlling, and terminating transmission gear shifting of the endless chain on the rear transmission sprockets. The main housing member encloses a drive motor, a linear actuator threaded shaft which is actuated for rotational motion by the drive motor, a linear actuator stub mounted upon the shaft and selectively engaged by the shaft for linear reciprocal movement within the housing member, and a cable attachment for attaching an end of the rear derailleur cable to the stub so that selective linear movement of the stub shifts the derailleur cable and causes the derailment of the chain from one sprocket to another sprocket. Embedded in each housing member is an inductance coil which encompasses a portion of both the stub and the shaft, and the linear movement of the stub within the housing induces voltage changes in the coil which correspond to specific gears of the bicycle. Such voltage changes are interpreted by the mpu to initiate, control and terminate automatic gear shifting.

15 Claims, 9 Drawing Sheets

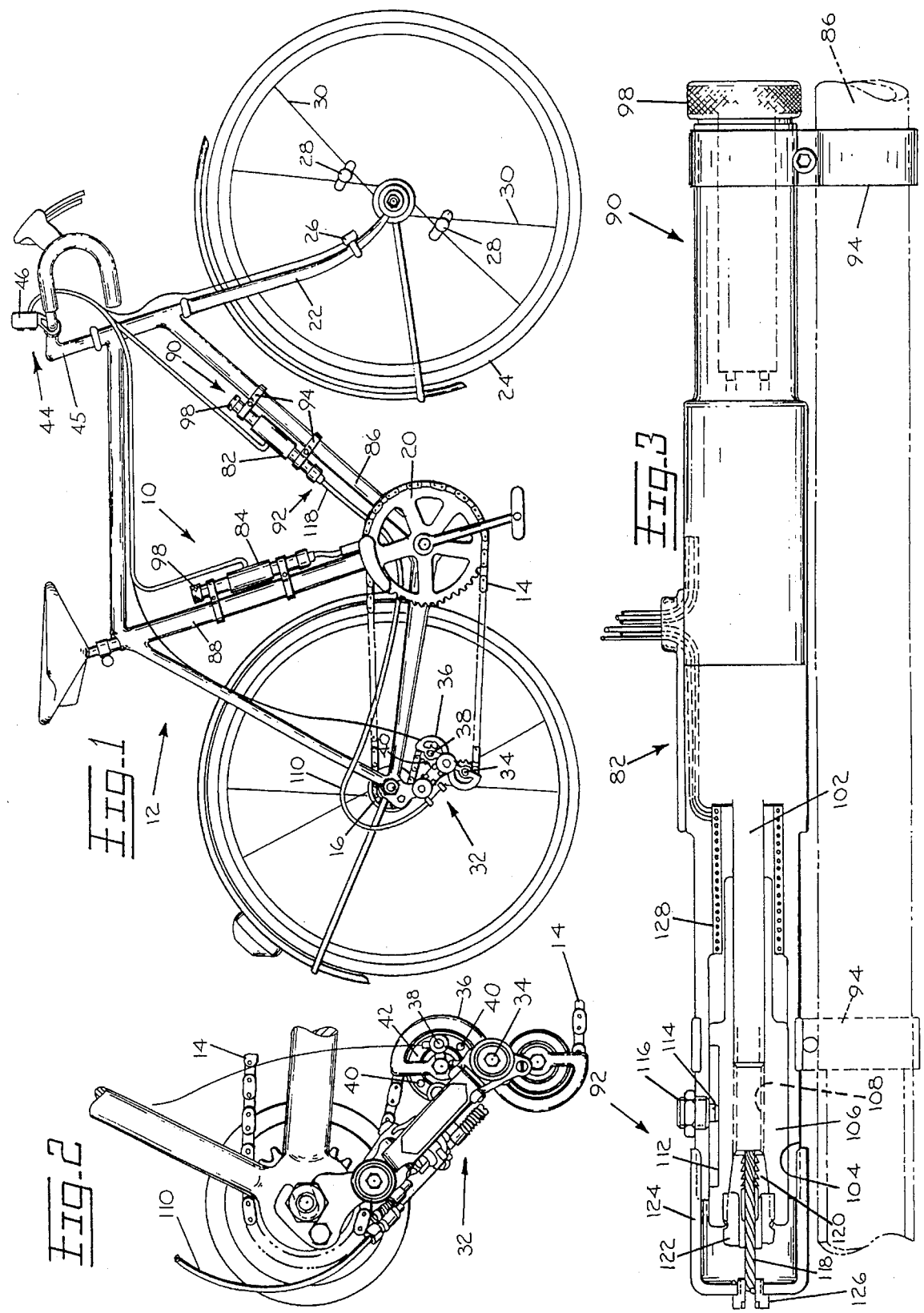

AUTOMATIC GEAR CHANGING SYSTEM

BACKGROUND OF THE INVENTION

This invention relates generally to automatic transmissions fitted to human-powered vehicles, and more particularly pertains to an electromechanical automatic gear-changing system which can be retrofitted to various multi-speed bicycles for automatically derailing the endless chain from one of a plurality of rear transmission sprockets to another transmission sprocket.

Bicycling has become a popular hobby in recent years in part because of its simplicity and healthiness. Whether done on city streets, country roads, cross country, or on bicycle paths and trails, bicycling is a pleasant, invigorating hobby and form of exercise for individuals or groups, young or old, couples or families.

Multi-speed bicycles have a manually operable and adjustable variable speed transmission, and such bicycles also generally include: a plurality of laterally-spaced, axially-aligned, rear transmission sprockets; a plurality of laterally-spaced front chain wheels; an endless chain drivingly in mesh with the transmission sprockets and chain wheels; shifting levers mechanically connected to a front gear shifting assembly and the front chain wheels; and shifting levers mechanically connected to a rear derailleur shifting assembly which physically interacts with the chain for shifting the transmission by derailing the chain from one to another rear transmission sprocket.

Inexperienced as well as experienced bicyclists frequently encounter problems with transmission gear shifting. The bicyclist often relies on trial-and-error and an intuitive feel for such changing conditions as terrain and speed in a constant, and often unsuccessful, attempt to match the most efficient transmission gear to the desired speed. On long, level stretches, this problem is minimized, but bicycling is done on varied terrain including hills and valleys, abrupt dips, sharp turns, narrow berms, hidden driveways, and woodland trails.

In addition, the derailleur shifting assembly (rear and/or front) may not properly derail the chain from one rear transmission sprocket to another sprocket due to the abruptness of the shift or defects in the handlebar-mounted gear-shifting levers and/or the rear transmission assembly. If the endless chain does not step up or down smoothly and quickly on the various sprockets and chain wheels during shifting, damage to the chain, the sprockets, and chain wheels can result and possible injury to the rider could occur due to the abruptness of chain shifting or lack thereof.

In an effort to improve the reliability of transmission gear shifting, and in order to make such gear shifting easier, a number of electrical, electromechanical, hydraulic, and pneumatic automatic gear-shifting devices have been invented. Two such devices are the Clem electronically-controlled bicycle transmission (U.S. Pat. No. 4,605,240) and the Matsumoto et al. electrically operated transmission gear system for bicycles (U.S. Pat. No. 4,490,127).

For shifting a conventional derailleur on a multi-speed bicycle, the Clem patent employs a digitally-controlled linear motor/actuator electrically connected to a microcomputer. Micro-switches mounted about a screw shaft of the linear actuator provide feedback information to the microcomputer for transmission control function and also to signal the position of the derailleur to the microcomputer. The Matsumoto et al. patent utilizes an electrically operated gear-shifting mechanism which includes a reversible motor, a takeup reel actuable by the motor, a wire joined to the takeup reel and the guide for displacing the latter in response to rotation of the takeup reel to shift the endless chain into driving mesh with one or another of the rear transmission gears.

However, despite the above-mentioned inventions, there remains a need for an automatic gear-shifting mechanism or apparatus which can be retrofitted to various multi-speed bicycles quickly and securely, performs reliably under adverse conditions, includes elements or component parts (sensors and circuit elements) that can withstand rugged treatment and still perform accurately, and yet includes the ability to adapt to different speed parameters, various riding terrains, and different rider modes, such as leisure riding and cross country bicycling. Moreover, there remains a need for a gear-shifting mechanism that can accommodate a range of multi-speed bicycles without altering the existing chain and gear assembly.

SUMMARY OF THE INVENTION

The present invention comprehends an electromechanical gear-changing system which can be retrofitted on multi-speed bicycles to permit automatic shifting of the endless chain from one to another rear transmission sprocket so the rider will be on the right gear at his/her current speed. The gear-changing system is adapted for removable securement to a down tube of the bicycle, preferably to the forwardly-extending down tube angled at 45° to the front chain wheel. In addition, a second gear-changing system can be retrofitted to the bicycle to permit automatic gear shifting of the chain from one to another front chain wheels.

When mounted to a down tube of a multi-speed bicycle, the gear-changing system is used in combination with the following elements: a handlebar-mounted display console for displaying such parameters as trip miles, battery level, present bicycle gear, bicycle speed, and type of computer program being executed; a proximity sensor mounted to the front fork and operating in conjunction with two magnets mounted 180° from each other on the spokes of the front wheel; a proximity sensor mounted to the rear gear-changing assembly and operating in conjunction with two magnets mounted 180° from each other on the gear-changing assembly; and a microprocessor unit contained within a housing which is mounted to the handlebars for receiving output signals from both proximity sensors which are evaluated by the microprocessor for determining the angular velocity of the front wheel and the angular velocity of the rear wheel.

In addition, the microprocessor unit ("mpu") also controls and interacts with other structural elements of the gear-changing system in order to determine when to shift the chain to the appropriate rear transmission sprocket so that the chain is derailed to the appropriate rear transmission gear at the appropriate bicycle speed. The unit also contains several algorithms and pre-programmed memory circuits for initiating, controlling, and terminating gear shifting. One of the algorithms programed into the circuitry of the mpu can be a program called "All-Terrain". This program will be initiated by the rider from the display console when the rider is on rugged terrain and will have a maximum speed parameter of 35 mph. Another algorithm that can be programed into the circuitry of the mpu is an automatic transmission program called "Pro". This program will also be initiated by the rider during bicycling on predominantly level terrain, and can have a maximum speed parameter of 60 mph. A manual routine will also be programed into the circuitry of the mpu. This routine will be initiated by the rider pressing down on either a manual down button or a manual up buttom so that the rider can manually shift gears, thus bypassing any automatic gear-shifting program and directly controlling chain derailment on the rear transmission sprockets. Moreover, if a second automatic gear-shifting system is added to automatically derail the chain on the front chain wheels, at least two front derailleur routines will be added, an All-Terrain front derailleur routine a Pro front derailleur routine.

The gear-changing system includes a generally cylindrical, elongated main housing member. The housing has an upper end, a lower open end, and external retaining grooves located at each end. Removable mounting brackets fit into each retaining groove and around the down tube of the bicycle, thus allowing the removable mounting of the main housing member to the bicycle. Enclosed within the housing adjacent the upper end is a motor unit which includes at least one, and very likely two, batteries in series, an electrical motor, and a transmission. A rotatable, externally threaded linear actuator shaft is located within the housing adjacent the lower end and is driven by the motor unit. An elongated linear actuator stub is also located within the housing adjacent the lower end. The linear actuator stub is concentric with the linear actuator shaft and threadably mounted thereupon for encompassing a portion of the linear actuator shaft. In turn, the stub and shaft are concentric to the main housing member. The stub is adapted for selective linear reciprocal movement within the housing and is actuated for such movement by the rotation of the shaft; and the movement of the stub causes the derailment of the chain from one rear transmission sprocket to another adjacent sprocket. More specifically, the shaft threadably engages an annularly threaded stub bore of the stub, and the rotation of the shaft causes linear reciprocal movement of the stub within the main housing member adjacent the lower end thereof.

In order to secure the end of the rear derailleur cable to the stub, a cable attachment means is utilized which permits the removable attachment of the rear derailleur cable end to the stub. The cable attachment means includes a multi-jaw chuck which is adapted for removable securement into the annularly threaded stub bore which extends through the stub. In addition, a chuck engagement nut is used to press the chuck jaws together for firmly clasping the chuck jaws to the end of the derailleur cable. A cable housing or collet is threaded onto the lower end of the housing, and then a swivel is threaded onto the collet. The cable is inserted through the bore of the swivel and into the open area of the multi-jaw chuck, whereupon attaching the nut to the stub closes the gripper teeth of the chuck onto the derailleur cable end.

A longitudinal slot is located on the surface of the stub, and an anti-rotation screw is inserted through the body of the main housing member and into the slot. The anti-rotation screw prevents the actuator stub from rotating when engaged by the shaft for linear reciprocal movement.

In order to initiate, control, and terminate the derailing of the chain during bicycle riding, a position indicating means is provided which is interactive with the shaft, the stub and the microprocessor. The position indicating means is essentially an inductance coil which produces varying amounts of voltages in a pre-determined range along its length which are then evaluated by the microprocessor to control gear shifting. The inductance coil is embedded within the housing so that the inductance coil encompasses a substantial portion of the shaft and, depending upon the amount of reciprocable movement of the stub during a particular gear shifting operation, a varying portion of the length of the stub. The inductance coil has conductors going to the microprocessor for relaying electrical signals therebetween. Movement of the stub within the housing increases or decreases the voltage of the inductance coil by aiding or abiding the magnetic field induced by the coil. As the magnetic field strength increases by increasing the surface area of the stub in relation to the inductance coil, the voltage increases. This incremental increase—or decrease—in discrete voltage changes is evaluated by the microprocessor to determine the amount of gear shifting occurring, and the precise increase/decrease in voltage would determine on what gear the chain had been derailed. The shaft would be manufactured from a non-ferrous material and the stub which would be interactive with the inductance coil would be manufactured from a ferrous material. As the coil interactive portion of the stub moves linearly on the threaded shaft within the housing, the voltage of the inductance coil would be incrementally decreased/increased by tenths or hundredths of a volt. Using the inductance coil as the gear position indicating means provides a relatively economical and very precise method for controlling bicycle gear shifting and providing input to the microprocessor in order to initiate, control, and terminate gear shifting.

The above and other features, objects, and advantages of the present invention will become more apparent from the following description and accompanying drawings in which several embodiments of the invention are shown by way of illustrative examples.

BRIEF DESCRIPTION OF THE DRAWINGS

FIG. 1 is a side elevational view of the automatic gear changing system mounted to a multi-speed bicycle;

FIG. 2 is an enlarged fragmentary view of structural components of the automatic gear changing system first shown in FIG. 1;

FIG. 3 is a sectioned elevational view of the servomotor first shown in FIG. 1;

DETAILED DESCRIPTION OF THE PREFERRED EMBODIMENT

Referring to FIGS. 1–6 and 8, there is shown an automatic electromechanical gear shifting or derailing system 10 which can be retrofitted onto an already existing multi-speed bicycle 12 or can be manufactured and assembled as part of a new multi-speed bicycle (not shown). The system 10 can be utilized for multi-speed bicycles ranging from a three-speed up to a twenty-four speed. The system 10 includes a number of physical structures and features which provide the rider with a reliable, repeatable, and accurate means for automatically shifting the bicycle 12 from one gear to another gear without rider intervention. Thus, the rider can bicycle over a variety of terrain without ever manually shifting the gears of the bicycle 12, yet the system 10 also provides a means for manually shifting gears through direct rider intervention should the system 10 become disabled or unusable.

Figure 8:
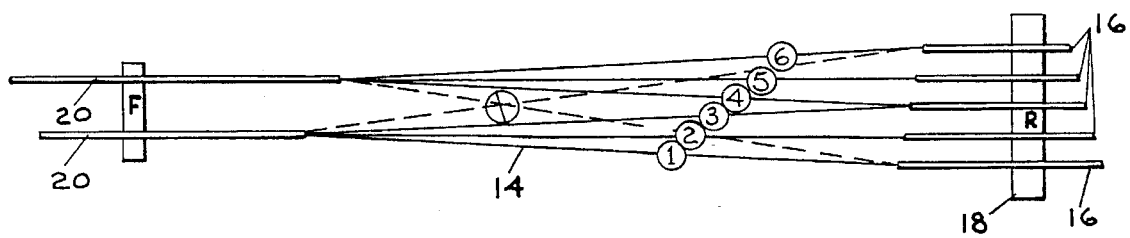
FIG. 8 is a schematic diagram illustrating one possible gear changing configuration for a multi-speed bicycle.
Figure 9:
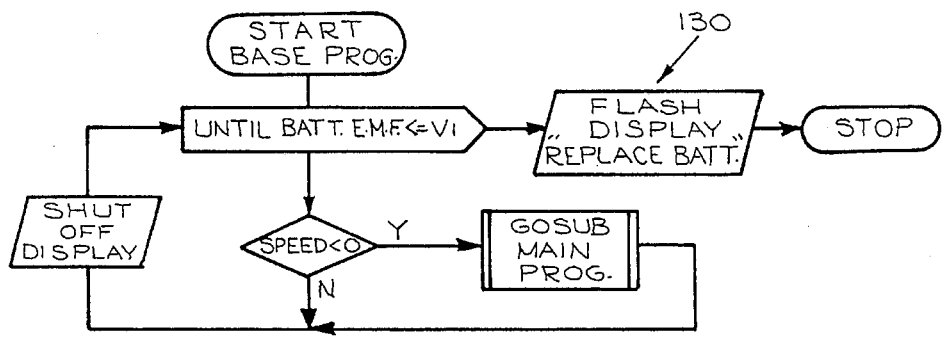
FIG. 9 is a flow chart of the base program for use by the automatic gear changing system.

As shown in FIGS. 1, 2, and 8, the bicycle 12 includes an endless chain 14 mounted upon one of a plurality of rear transmission sprockets 16 mounted adjacent and in axial alignment to each other on the rear wheel axle 18. FIG. 8 illustrates one configuration of gearing for the sprockets 16. The chain 14 is also mounted upon at least one front chain wheel; within the embodiment of the present invention, as shown in FIG. 8, two front chain wheels 20 are shown for illustrative purposes since that is a standard configuration for multi-speed bicycles. It is obvious that a wide range of gearing configurations could have been illustrated comprising a plurality of rear transmission sprockets and a plurality of front chain wheels, but the configuration illustrated in FIG. 8 is a very common one for multi-speed bicycles.

Mounted to a front fork 22 of the front wheel 24 is a front wheel speed sensor 26 which may be a proximity or reed switch, and which is conventional in the art. In addition, a pair of magnets 28 are mounted opposite to one another at 180° to opposed spokes 30 of the front wheel 24. The electrical signals are generated by the sensor 26 each time the magnets 28 move by sensor 26 during the rotation of the wheel 24, and the generation of electrical signals from the sensor 26 is part of the process of determining the angular velocity of the wheel 24 and also for determining the amount of acceleration or deceleration of the wheel 24. FIGS. 1 and 2 also illustrate a rear gear-changing assembly 32 which is conventional in multi-speed bicycles and is a necessary structural element for bicycle gear shifting. Mounted to the sprocket bolt 34 adjacent the outer cage leg 36 is a rear wheel speed sensor 38. In addition, a pair of rear wheel magnets 40 are mounted to the upper roller 42 adjacent the sensor 38. The magnets 40 are spaced 180° from each other and continuously move past the sensor 38 when the bicycle 12 is in motion. The sensor 38 and the magnets 40 can be of the same type as the sensor 26 and magnets 28, and like the sensor 26 and magnets 28, are conventional and well known in the art and may be proximity or reed switches.

Figure 5:
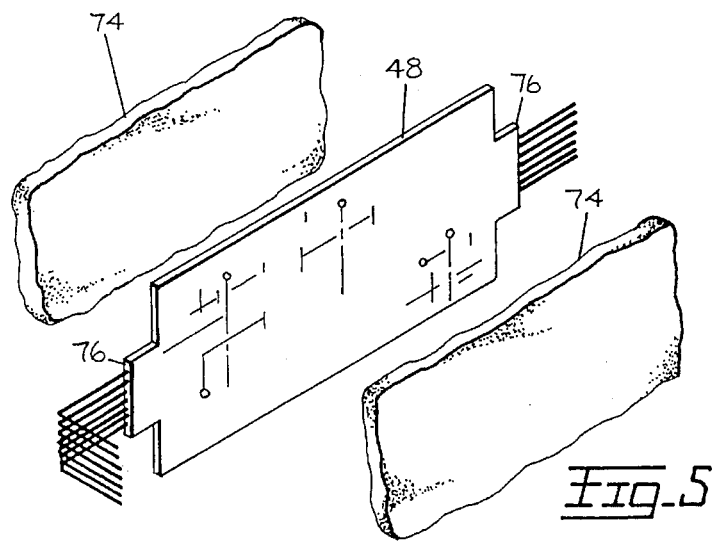
FIG. 5 is a isometric view of the microprocessor unit for the automatic gear changing system.

With reference to FIGS. 1, 2, and 4–6, the sensors 26 and 38 have electrical leads or conductors going to a handlebar-mounted console unit 44. The unit 44 is mounted to the handlebar 45 and consists of a primary console unit 46 which contains the microprocessor unit 48 as shown in FIG. 5, and a secondary console unit 50 which can be mounted adjacent to either of the hand grips and which includes the manual override up and down shift switches 52 and 54 and the auto program switch 56. The unit 50 is mounted adjacent to either the left- or right-hand grips in order to allow the rider to quickly and easily shift from the manual gear shifting program to the automatic gear shifting program by merely pressing the manual up or down switch 52 or 54 or the auto program switch 56 with the rider's thumb, for initiating the program for automatic gear shifting. The unit 46 is mounted to the handlebar 45 by two spaced-apart brackets 58 and thumb screws 60, and the unit 50 is also mounted to the handlebar 45 by means of a bracket and thumb screw; both units 46 and 50 can be easily and quickly rotated out of the way for maintenance or replacement by simply unscrewing the thumb screws and rotating the units 46 and 50 downward on the handlebar 45 or completely unscrewing the thumb screws for removing the units 46 and 50 themselves from the handlebar 45.

The unit 46 contains a number of visual displays, such as liquid crystal displays, for displaying system information to the rider. The system parameters displayed to the rider on the primary console unit of the present invention include trip miles 62, gear transmission speed 66, reset trip miles 68, and Prog. on parameter 70. The Prog. on parameter 70 displays the type of program currently in use by the rider. Also, shown in FIG. 6, an on/off switch 72 for the mpu 48 is located on one side of the unit 46. The mpu 48 itself, which is the brains, so to speak, of the system 10 is shown in FIG. 5. The mpu 48 is sandwiched between a pair of soft, absorbant gel pads 74 which are also contained within the unit 46. The mpu 48 contains the circuitry and pre-programed chips necessary for controlling the automatic gear-changing system. The various chips and circuitry would be contained on one or several custom-designed P.C. boards. The mpu 48 shown in FIG. 5 has a multi-pin connector or ribbon cable 76 inserted into the mpu 48 at opposed edges thereof. The cables 76 electrically connect the cabling coming from various structural elements on the bicycle 12, such as the sensors 26 and 38 and magnets 28 and 40, to the various circuitry of the mpu 48. The two opposed multi-pin edge connectors 76 shown in FIG. 5 are for illustrative purposes only; the connectors 76 can be attached to the unit 46 where there is proper circuitry for receiving such connectors 76.

Figure 6:
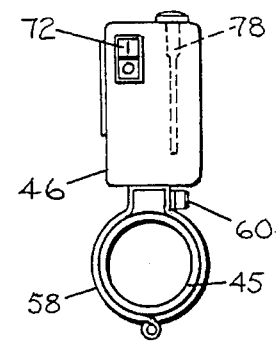
FIG. 6 is a side elevational view of the console unit first shown in FIG. 4.

The mpu 48 will contain pre-programed circuitry consisting of various types of programs with each program having a different level of difficulty and different values for parameters such as velocity increments, velocity ranges, and transmission gears. These programs will be part of the EPROM (Electrically Programmable Read Only Memory) or PROM (Programmable Read Only Memory) circuitry of the mpu 48. Two such programs which are envisaged for the present invention are the programs "Pro" and "All-Terrain". Moreover, as shown in FIG. 6, the unit 46 contains an insert for receiving a plug-in module or PC board. These plug-in modules or boards will be similar to the add-on cards that can be accommodated by the hardware of a desktop PC. As shown in FIG. 6, the insert or interface 78 on the unit 46 for receiving the plug-in module or card is located and comes in from the top of the unit 46; however, the interface 78 could be located anywhere on the unit 46. The insert or interface on the primary console unit would be adapted to receive EPROMs, and these EPROMs would be like the small boards or cards which can be bought for the popular Nintendo computer game series. The EPROMs would be plugged into the insert 78 and would function in a manner similar to the add-on cards for a desktop PC. Each EPROM module or board would contain a unique rider program different from the factory-provided program or programs contained in the circuitry of the mpu 48. Such plug-in EPROM modules or boards would accomplish two things: reduce the amount of factory-provided programming for the mpu 48; and provide greater flexibility and fun for the user of the system 10 in that the rider would have a number of different rider programs to select and use during bicycle riding. In addition to the factory-provided program or programs contained within the mpu 48, the rider could purchase perhaps a half dozen separate plug-in EPROM modules, each one of which would be a different rider program targeted to distinct bicyle rider age groups and with different speed increments and ranges. Titles for such programs could be "Novice Rider", "Leisure", and "Mountain Bike".

Figure 7:
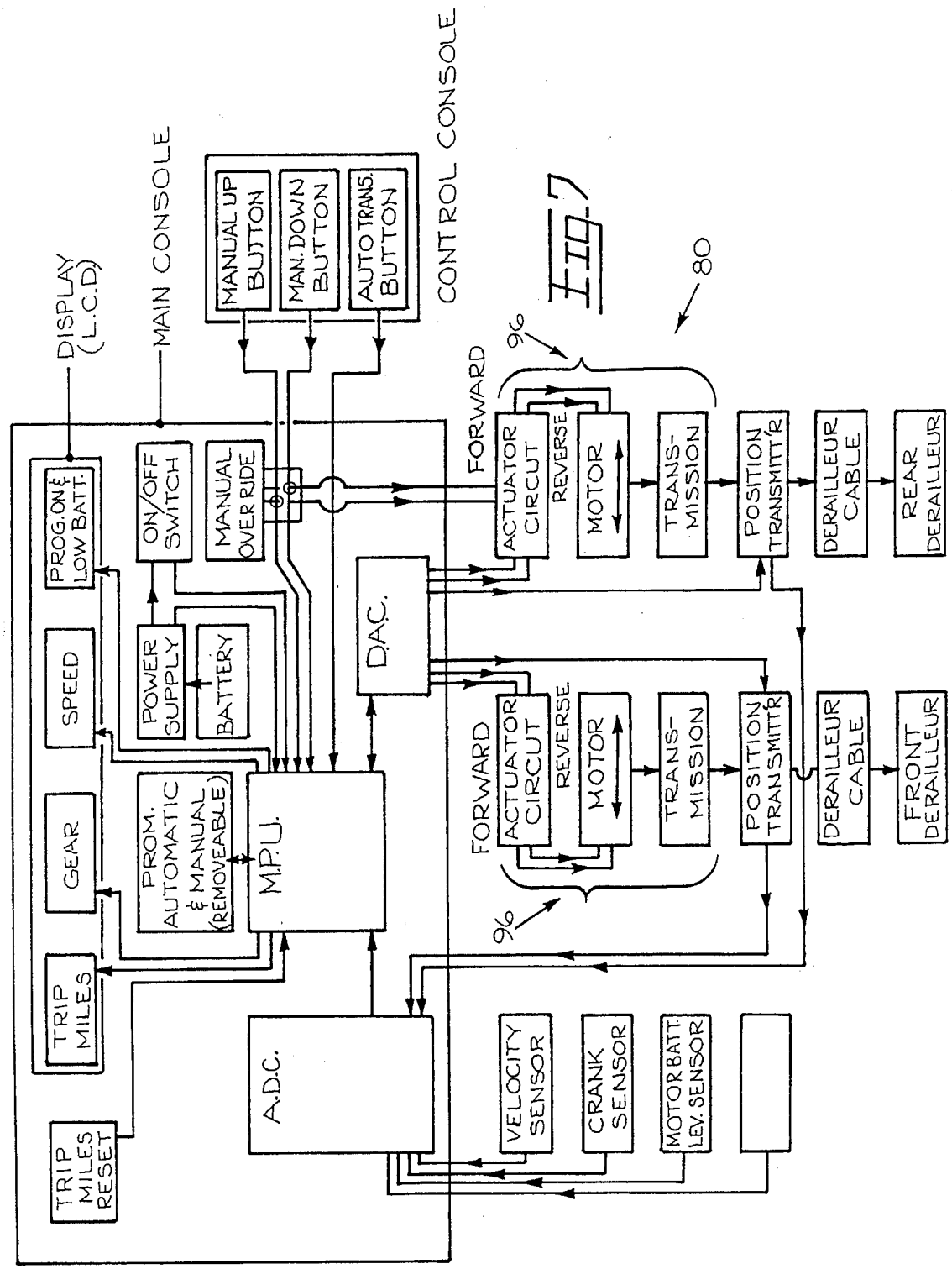
FIG. 7 is a schematic block diagram illustrating the basic functions and interactions between the microprocessor and other structural elements of the automatic gear changing system.

FIG. 7 illustrates an electrical block diagram for the mpu 48. Anyone skillful in the art of electronics or electrical engineering will find the symbols of this block diagram 80 easily understandable. It should be noted that FIG. 7 illustrates one configuration for an electrical block diagram for the present invention; variations from the electrical diagram shown in FIG. 7 are conceivable and such variations would still remain within the scope of the present invention.

Referring to FIGS. 1 and 3, there is shown a main housing member 82 and a second housing member 84 each of which are mounted to respective down tubes 86 and 88 of the bicycle 12. The member 82 is a generally cylindrical and elongated structure which is adapted for removable mounting to the down tube 86 of the bicycle, 12 and the member 82 is mounted to the tube 86 angled at 45° from a level surface. The member 82 has an upper end 90 and a lower open end 92, and at each end 90 and 92 are grooves or recesses for receiving a bracket or strap 94 which secures the members 80 and 84 to the respective down tubes 86 and 88. The members 82 and 84 may also be called the servomotor units of the system 10, and the member 82 interacts with the mpu 48 to initiate, control, and terminate gear shifting for the bicycle 12. Encased within the member 82 and generally extending from the central portion of the member 82 to the upper end 90 is a motor unit 96 which includes either one or several batteries in series, the motor itself which includes the electronic assembly, relays and the electrical contacts, and the transmission gear assembly. (The electric motor and the transmission gear assembly are conventional in the art and are, therefore, not shown in FIG. 3. Although they are indicated in FIG. 8.) In the present invention, the preferred type of batteries to be used are rechargeable nickel cadmium batteries, and two such batteries will be inserted into the member 82 adjacent the upper end 90. The member 82 may also accommodate portable battery packs which come in the form of an end cap 98 which is securable to, and removable from, the upper end 90 of the member 82. The end cap 98 itself could be part of the swivel of one of the nickel cadmium batteries as shown in FIG. 3. The member 82 also includes a battery charger 100 which is shown in FIG. 3 as a small metal clip on the exterior of the member 82. In the block diagram of FIG. 7, the motor and the transmission are also shown as well as the various input and output signals necessary for shifting the transmission gears. FIG. 1 also illustrates the member 84 which is identical to the member 82 and contains the same structural elements enclosed therein. The electrical block diagram 80 shown in FIG. 7 takes into account the use of two servomotors (the members 82 and 84) by duplicating symbols for the motor, transmissions, and other elements to be described hereinafter. If the rider desired only to have the automatic ability to shift the gears on the sprockets 16, then only the member 82 would be needed. If, however, the rider wanted the ability to automatically shift the chain 14 on the wheels 20, then the member 84 would be mounted to the down tube 88 on which the seat of the bicycle 12 is secured. The block diagram on FIG. 7 takes into account the use of servomotors to automatically shift the chain 14 on the sprockets 16 and on the wheels 20.

Referring to FIG. 3, there is shown a linear actuator threaded shaft 102 disposed within the member 82 adjacent the lower end 92 thereof. The shaft 102 is externally and annularly threaded along its length, and is concentric with the member 82 and is disposed within the member 82 in axial alignment with the batteries, the transmission gear assembly, and the drive motor of the motor unit 96. The shaft 102 is selectively actuated by the drive motor for rotatable movement therein as part of the mechanical initiation of chain derailment and transmission gear changing or shifting. It should be noted that the shaft 102 does not move linearly within the member 82, but only rotates within the member 82. An interior annular space or chamber 104 surrounds the entire shaft 102 and extends from the lower open end to approximately one third of the distance into the member 82. Mounted to the shaft 102, and selectively engaged and actuated thereby, is a linear actuator stub 106. The stub 106 is mounted to the shaft 102 so that the selective rotatable motion of the shaft 102 will cause the stub 106 to move in a linear reciprocal manner on the shaft 102 a pre-determined distance to facilitate chain 14 shifting and gear changing. More specifically, the stub 106 is a generally cylindrical, elongated structural element which has an internal annularly threaded stub bore 108 extending therethrough. The stub 106 is mounted to the shaft 102 so that the stub bore 108 meshes with and is engaged by the external annular threads of the shaft 102. When the stub 106 is engaged by the continuous rotatable motion of the shaft 102, the stub 106 moves in a linear reciprocal manner within the member 82 toward either the lower end 92 or the upper end 90 of the member 82. The stub 106 may be referred to as the core element, reciprocably movable within the member 82, and the stub 106 is concentric with the shaft 102. When engaged by the rotatable motion of the shaft 102 the linear movement of the stub 106 mechanically initiates chain derailment by pulling or pushing on a rear derailleur cable 110 causing the chain 14 to shift from one sprocket 16 to another sprocket 16. Because of the manner in which chain derailment and gear shifting is initiated, controlled, and terminated, the stub 106 is manufactured from a ferrous material.

As shown in FIG. 3, a substantial portion of the exterior surface of the stub 106 abuts the surface 104 of the member 82 generally adjacent the lower end 92. As shown in FIG. 3, the reciprocable movement of the stub 106 occurs within the chamber 104 defined by the member 82. It is possible for the stub 106 to bottom out and completely encompass the shaft 102 in a gear shifting operation, but the stub 106 cannot be threaded off of the shaft 102. Removal of the stub 106 and the shaft 102 would reveal the chamber 104 of the member 82 and the extension of the chamber 104 from the lower opening 92 substantially into, and concentric with, the member 82.

To prevent the stub 106 from rotating when the stub 106 is actuated by the shaft 102, the stub 106 and the member 82 have several features to prevent rotation of the stub 106 and allow for only linear reciprocal movement of the stub 106 within the chamber 104 of the member 82. As shown in FIG.

3, the stub 106 includes a longitudinal slot 112 formed on the exterior surface of the stub 106. The slot 112 is a narrow recess or channel which has a length approximately one-third to one-half that of the stub 106 and opens up to the inner cylindrical surface of the chamber 104 of the member 82. The slot 112 is formed on the exterior surface of the stub 106 and is opposite of the threaded stub bore 108. However, the slot 112 alone would not prevent the stub 106 from rotating when the stub 106 is engaged for linear movement by the rotatable motion of the shaft 102. An anti-rotation means is still necessary for preventing rotatable motion of the stub 106 and allowing only linear reciprocal movement for chain derailment and gear shifting. Adjacent the lower end 92 of the member 82 and laterally extending into and through the body of member 82 is a lateral bore 114 as shown in FIG. 3. The bore 114 registers with the chamber 104 of the member 82 and is aligned with the slot 112 of the stub 106. The anti-rotation means includes an anti-rotation screw 116, such as a thumb screw, which is inserted into and through the bore 114 and then into the slot 112 of the stub 106 so that the screw 116 can be firmly fastened against the shallow bottom of the slot 112. When the stub 106 is actuated for linear reciprocable movement by the rotatable motion of the shaft 102, the slot 112 moves concomitant with the stub 106 but the stub 106 is prevented from rotating because of the insertion of the screw 116 projecting into the slot 112. As the detailed description proceeds, the necessity of the anti-rotation means and the slot 112 on the stub 106 will become apparent.

With reference to FIGS. 1–3, a cable attachment means is utilized to attach an end 118 of the rear derailleur cable 110 to the member 82 in order to facilitate chain derailment and gear changing. The cable attachment means may be embodied by numerous structural elements and features; the cable attachment means shown in FIG. 3 is one preferred embodiment although it is not exclusive thereof. The cable attachment means of the present invention includes a multi-jaw chuck 120 inserted into the funnel-shaped opening of the threaded bore 108 of the stub 106. The chuck 120 has annularly-arranged gripping teeth for firmly and securely grasping the end 118 of the cable 110 so that linear movement of the stub 106 causes a simultaneous movement of the cable 110. The chuck 120 travels in a linear reciprocal manner concomitant with the movement of the stub 106 within the chamber 104 of the member 82, and the chuck 120, the stub 106, and the shaft 102 are concentrically disposed within the chamber 104 of the member 82. The chuck 120 is wedged into the funnel-shaped opening of the stub 106, and is retained in place by a chuck engagement nut 122 which is threaded into the end of the funnel-shaped opening of the stub bore 108. In order to attach the cable 110 to the stub 106, the end 118 of the cable 110 is inserted into and through the nut 122 for gripping by the teeth of the chuck 120. Then the nut 122 is threadably fastened into the end of the funnel-shaped opening thereby wedging the chuck 120 into the funnel-shaped opening and in the process closing the gripping teeth upon the end 118 of the cable 110.

Several other structural elements are added, as shown in FIG. 3, to prevent water and debris from getting into the bore 108 of the stub 106 and the chamber 104 of the member 82. Threaded onto the exterior surface of the member 82 adjacent the lower end 92 thereof is a cable housing retainer and assembly end cap 124, and this end cap 124 is threadably attached to the member 82 at the lower end 92 and closes off the end 92. The end cap 124 has a threaded aperture through which the end 118 of the cable 110 can be inserted. In order to provide support for the end 118 of the cable 110 which is inserted through the aperture of the end cap 124 and into and through the nut 124 for gripping by the chuck 120, a cable housing swivel 126 is utilized and is threaded into the aperture of the end cap 124 for supporting the end 118 of the cable 110 that is inserted therethrough. To remove the end 118 of the cable 110 from the stub 106 the first step would be to unfasten the cable housing swivel 126 from the end cap 124, and then to unfasten the end cap 124 from the lower end 92 of the member 82. Then the nut 122 would be unfastened and threaded off of the funnel-shaped opening of the stub 106. This would loosen the grip of the chuck 120 upon the end 118 of the cable 110 and would allow the rider to simply pull the cable 118 off of the chuck 120.

In order to provide a reliable, accurate, and efficient way to derail the chain 14 and shift the gears of the bicycle 10 on the sprockets 16, the present invention utilizes a position indicating means which is continuously interactive with the mpu 48, and is represented in the block diagram of FIG. 7 as the position transmitter. The position transmitter of the present invention is an inductance coil 128 which is embedded within the housing 82, as shown in FIG. 3, and is circumjacent a portion of the shaft 102 and the stub 106. The shaft 102 is manufactured from a nonferrous material so it does not interfere with the electromagnetic field of the inductance coil 128. The inductance coil 128 is interactive with the stub 106 also called the (core element) and functions somewhat like a proximity sensor in that the coil 128 responds to the various positions and movements of the stub 106 within the member 82. Energy for generating the electromagnetic field in the inductance coil 128 would come from a battery mounted within the unit 46 and could be two 1.5 volt batteries. The voltage changes would be induced by the linear movement of the stub 106 interracting with the electromagnetic field of the coil 128. More winding to the coil 128 would produce more exact readings of the position and movement of the stub 106; less windings for the coil 128 would provide less exact readings of the position and movement of the stub 106. The linear movement of the stub 106 will increase or decrease the voltage by aiding or abiding the electromagnetic field induced by the coil 128. As the electromagnetic field increases by increasing the area of the stub 106 to the coil 128 the voltage would increase; as the electromagnetic field decreases in strength by decreasing the area of the stub 106 to the coil 128 the voltage would decrease. These voltage changes would occur over a specified and pre-determined range, and as the field strength of the coil 128 increased or decreased during a gear changing operation, signals would be produced and transmitted to the mpu 48 for evaluation and interpretation. The signals produced from the interaction of the stub 106 with the electromagnetic field of the coil 128 would correspond to either a specific voltage or a voltage range.

One or several programs within the mpu 48 would correlate a predetermined and preprogrammed velocity range to angular velocity signals from sensors 26 and 38, and these would be correlated to a gear, then the velocity range and gear would be correlated to an inductance coil 128 voltage. For example, first gear in a six-speed bicycle could be correlated to the velocity range of 0–5 mph and the inductance voltage would be 0 to 0.1 volt; the velocity range of 5–10 mph would be correlated to the second gear, and these two parameters would be correlated to 0.1 volts; the velocity range of 10–15 mph would be correlated to third gear and these two parameters would be correlated to 0.2 volts; the velocity range of 15–20 mph would be correlated to fourth gear and then these two parameters would be correlated with 0.5 volts; the velocity range of 20–25 mph would be correlated with fifth gear and these two parameters would be 0.8 volts; and, finally, the velocity range of 25–30 mph would be correlated to sixth gear and these two parameters would be 1.0 volts. The velocity ranges and corresponding gear and voltages are given by way of example; depending on the circuitry, the programming, and the particular multi-speed bicycle, the voltages could be in tenths or hundredths and the velocity ranges correlated to a particular voltage and gear could be greater or less than the above example. However, given the amount of play inherent in the derailleur system, it may not be necessary for the mpu 48 to interpret signals from the inductance coil 128 representing hundreths of volts; accuracy and reliability of chain derailment may be achievable by the inductance coil 128 producing signals in tenths of volts. The sensor 26 and magnets 28 would be the means for sensing the angular velocity of the front wheel 24, and the sensor 26 would transmit electrical signals representing front wheel rpms continuously to the mpu 48 for interpretation. In addition and concomitant therewith, the sensor 38 and magnets 40 would be the means for sensing the rear wheel rpms and for transmitting electrical signals representing rear wheel rpm continuously to the mpu 48 for evaluation. As the angular velocity of the bicycle 12 increased or decreased, these system outputs would be continuously transmitted to the mpu 48 for evaluation and interpretation, and then the mpu 48 would initiate gear changing on the sprockets 16 by actuating those structural elements within the member 82 of the system 10.

The block diagram of FIG. 7 clearly illustrates the interaction between the mpu 48 and the various structural elements necessary to initiate chain derailment and gear shifting on the sprockets 16. Should a second servomotor (member 84) be utilized and mounted on the wheels 20, the block diagram on FIG. 7 also illustrates the circuitry necessary for the second servomotor.

FIGS. 9–18 illustrate the various programs in the EPROM or PROM of the circuitry of the mpu 48. These programs illustrate one method of programming the basic operating functions of the system 10. Some of the unique features of the programs are that the programs are interactive with the sensors 26 and 38, and the servomotor 82 and receive signals from the aforedescribed elements for continuously monitoring the various battery levels and wheel speeds to determine when to initiate and terminate gear shifting. Several of the programs also permit shutting down of the system 10 when no activity or interaction occurs after a set period of time in order to extend the life of the batteries (the arbitrary time period used in the programs for registering bicycle activity is three minutes). Thus, the rider is not required to manually shut down the system. In addition, when the battery charges for the various batteries that run the mpu 48 and the servomotor 10 drops below a predetermined level, the manual mode for the bicycle 12 is activated, permitting the rider to directly shift gears by alternatively pressing either the manual up 52 or manual down 54 switches. Thus, should the mpu 48 lose power or malfunction, the rider will still have the ability to manually shift gears on the bicycle 10 through this auxiliary manual mode. Furthermore, the programs shown in FIGS. 9–18 are arranged so that the last program the rider is in when he stops the bicycle 12 and shuts off the mpu 48 is also the first program, or point of entry, that he enters when he turns on the system 10.

Figure 10:
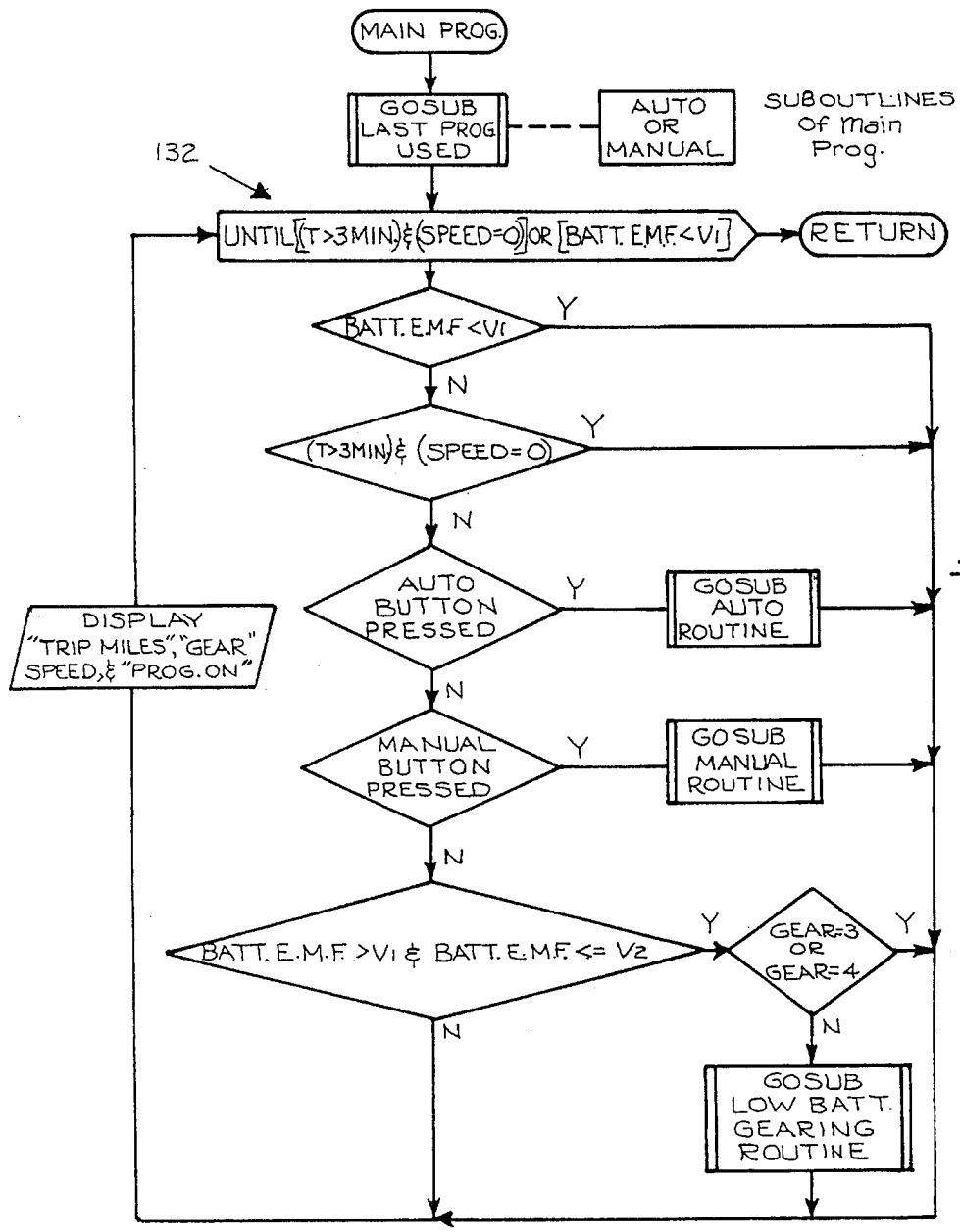
FIG. 10 is a flow chart of the main program for use by the automatic gear changing system.

When the rider mounts the bicycle 12, he or she will turn on the mpu by flipping the toggle switch shown in FIG. 6. As shown on FIG. 9, the base program 130 is initiated. The base program 130 is a very short routine which monitors the battery e.m.f. (electromotive force) to determine the amount of charge in the mpu battery and to ascertain that it is still above a predetermined limit labeled "V-1". V-1 would be determined through experimentation and set at the factory and would be the minimum level of current or voltage necessary to run the mpu 48 and the console displays 46 and 50. If the battery e.m.f. is less than V-1, the display 46 would flash "REPLACE BATTERY". The base program 130 would then stop and the rider would have to replace the battery for the mpu 48. Otherwise, if the battery charge were greater than V-1 and the speed of the bicycle 12 were greater than zero then the base program 130 would call the main program which is illustrated in FIG. 10. Immediately the rider would go into the last program he or she was in before the mpu 48 was turned off. The two sub-routines that would be called would be either the auto routine 134 shown in FIG. 11 or the manual routine 136 shown in FIG. 13. Like the base program 130, the main program 132 has a loop wherein three parameters are constantly being monitored—minutes, speed or velocity, and battery e.m.f.. The three minute time increment is simply an arbitrary period of time for an activity to occur, which may be either an increase or decrease in speed or the dropping of the speed to zero. If the parameters for the minutes and speed are met, or the parameter for the battery e.m.f. is met, then the main program 132 returns to the base program 130. Otherwise, the main program 132 proceeds and at the bottom of the loop the battery e.m.f. is being compared to two separate values designated "$V^1$" and "$V^2$". Like $V^1$, $V^2$ is set by experimentation at the factory and represents a voltage for the entire system 10. These voltages, designated $V^1$ and $V^2$, could be a separate chip in the mpu 48, and could be put in the chip first as a variable. From the main program 132, three sub-routines can be called: the auto routine 134, the manual routine 136, and the low battery gearing routine 138 shown in FIG. 14.

Figure 12:
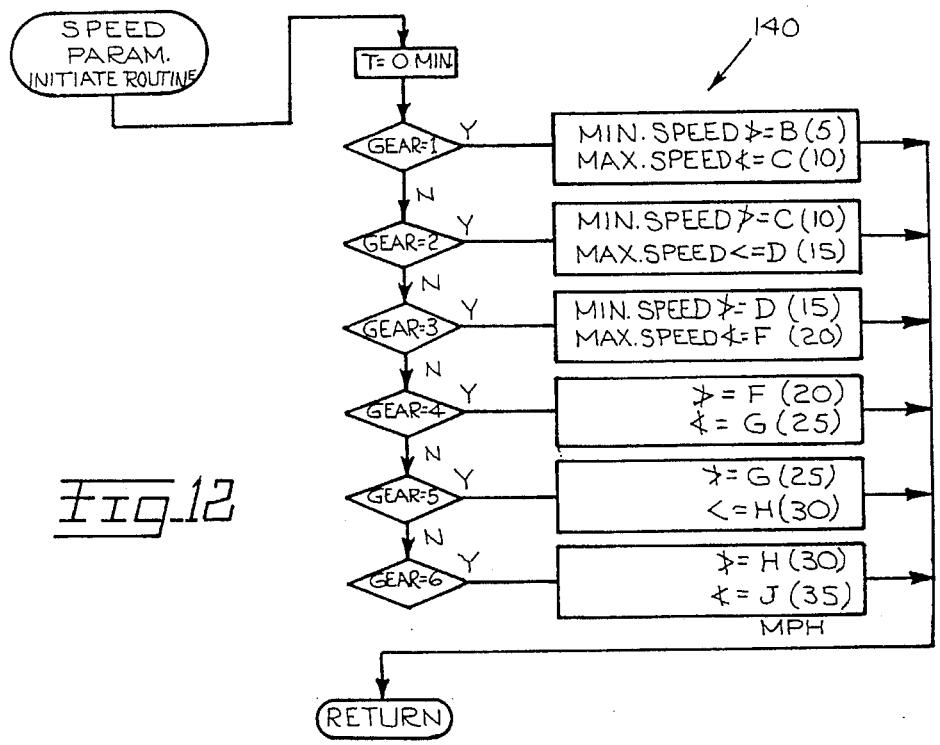
FIG. 12 is a flow chart of the speed parameter initiate routine for use by the automatic gear changing system.
Figure 4:
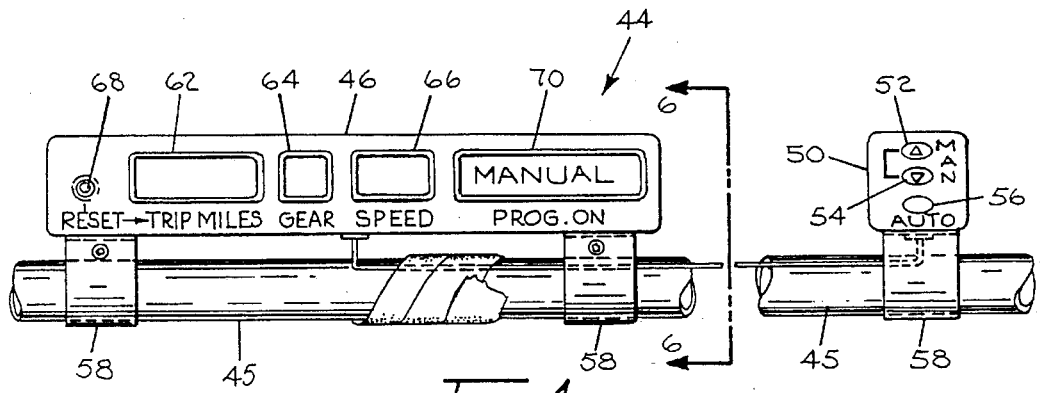
FIG. 4 is a front elevational view of the console unit first shown in FIG. 1.
Figure 11:
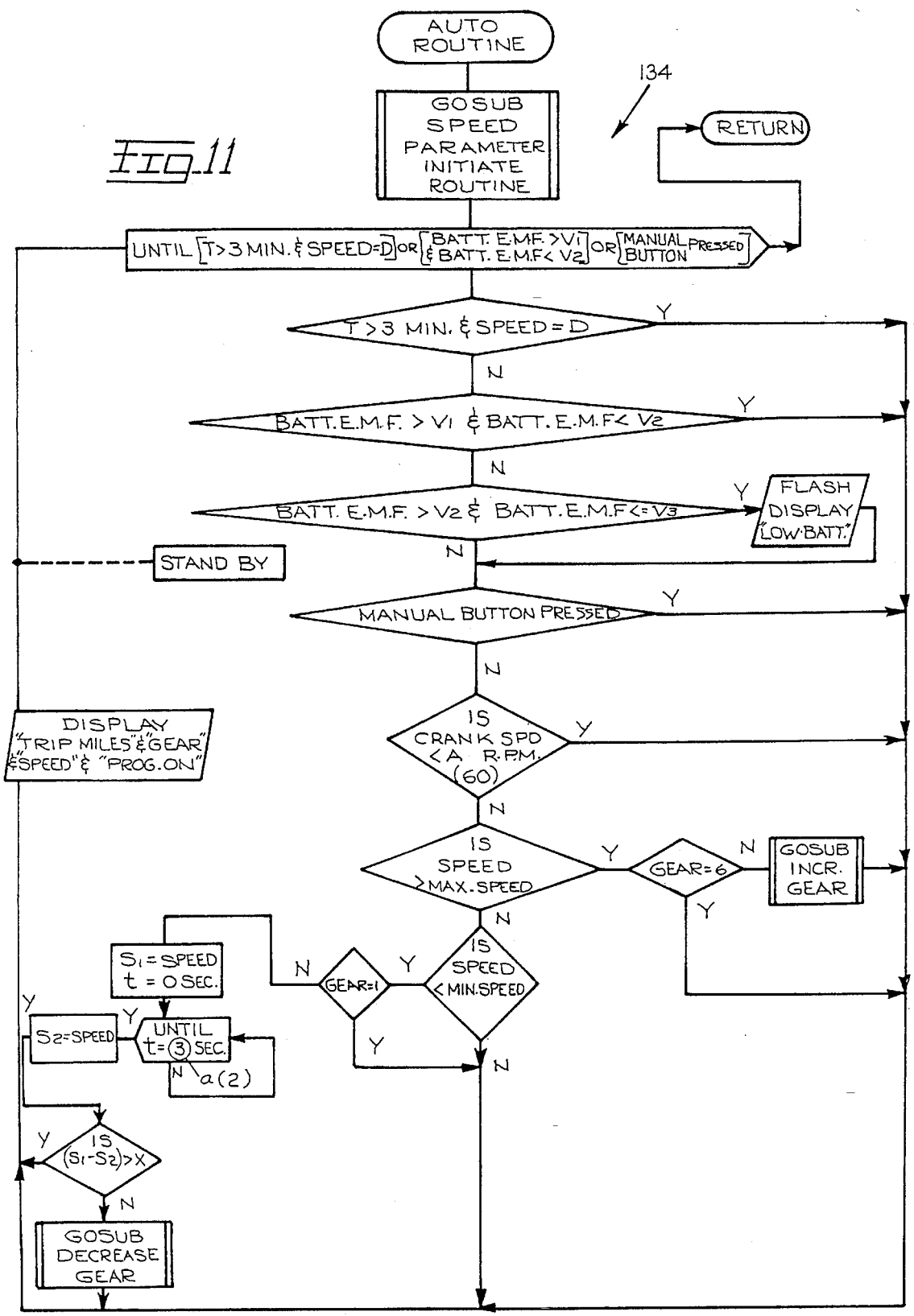
FIG. 11 is a flow chart of the autoroutine for use by the automatic gear changing system.

The essential routine for controlling and monitoring the system 10 is the auto routine 134 shown in FIG. 11. The auto routine 134 immediately calls the speed parameter initiate routine 140 which is illustrated in FIG. 12. Routine 140 initializes the velocity increments for each respective gear. For a multi-speed bicycle having six gears, the velocity ranges can be broken down into the various increments as shown in FIG. 12. The velocity ranges for each gear as shown in FIG. 12 are one example only and could be different for each particular bicycle. Routine 140 returns to the auto routine 134 and then the loop control for the auto routine 134 is triggered. Depending upon which of the parameters of the loop control of the auto routine 134 are or are not met, the successive steps of the auto routine 134 are processed or the auto routine 134 returns to the main program 134. The battery e.m.f. is monitored and if it is below the predetermined voltage for the entire system 10 the console display 46 flashes "LOW BATTERY". If the battery e.m.f. is within the proper range and the manual switches 52 and 54 are not pressed, then the auto routine 134 goes into those sequence of steps wherein gear changing is initiated, controlled, and terminated. In the auto routine 134 "$S^1$" is the wheel speed derived from signals from sensors 26 and 38 and "$S^2$" is also the speed as determined from sensors 26 and 38. The two-second increment is an arbitrary value to allow for a speed value determined before two seconds and which is stored in $S^1$ and a speed value after two seconds which is stored in $S^2$. The constant "X" represents a discriminatory value and is factory set and programmed into the circuitry of the mpu 48. The constant "X" is a decelerative value that is determined by the program parameters, and the constant "X" determines whether or not gear changing occurs. Thus, "X"

represents the deceleration of the bicycle 10 in miles per second. If $S^1$ minus $S^2$ is greater than X then the console 46 displays the trip miles, gear, speed, and the program or routine being executed. The auto routine 134 would be in standby as there would not be deceleration in bicycle speed. If $S^1$ minus $S^2$ is less than X then the decrease gear routine 142 would be called.

Figure 15:
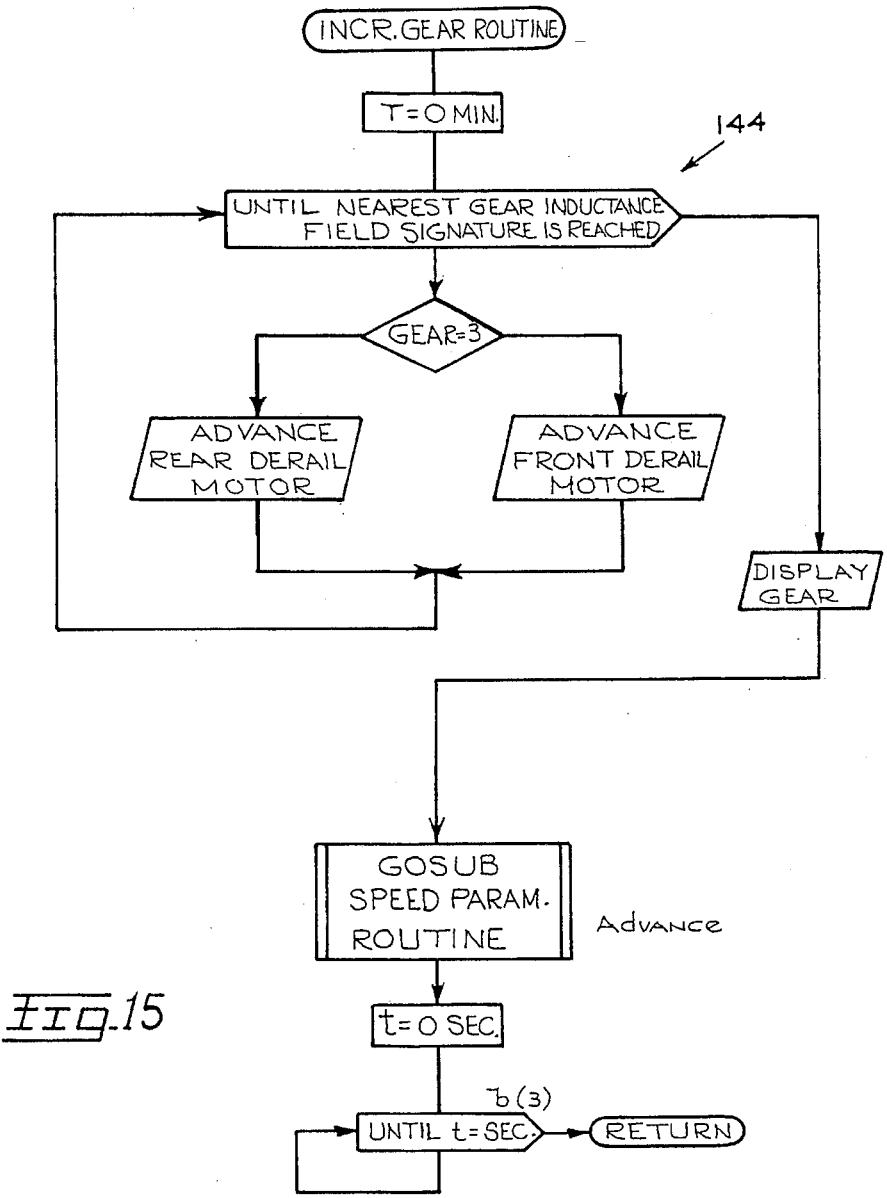
FIG. 15 is a flow chart of the increase gear routine for use by the automatic gear changing system.
Figure 16:
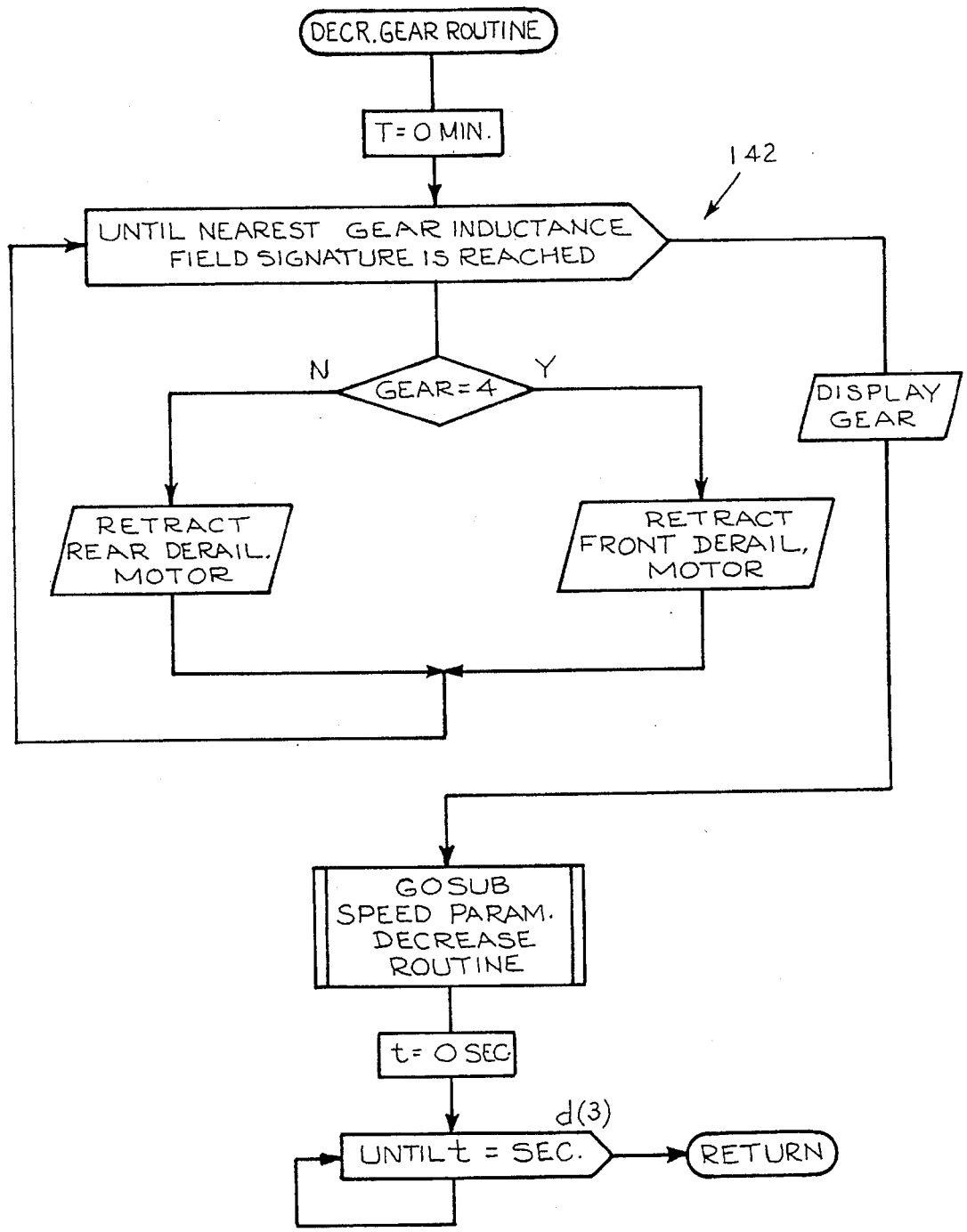
FIG. 16 is a flow chart of the decrease gear routine for use by the automatic gear changing system.

The decrease gear routine 142 is illustrated in FIG. 16 and is written so as to include both servomotors, i.e., members 82 and 84. The decrease gear routine 142 is a straightforward routine with the loop control being the value of the nearest gear inductance field signature. Once the chain 14 is derailed to a specific sprocket 16 and a constant velocity is maintained a three second time increment elapses in which time the velocity of the bicycle 12 is monitored and if the velocity does not change, the bicycle stays in that gear. This prevents the continuous derailment of the chain 14 from one sprocket 16 to another sprocket 16. This time increment also provides for the inductance coil 128 to transmit signals to the mpu 48 which are evaluated to determine the amount of chain derailment and the particular gear the rider is now in. FIG. 15 illustrates the increase gear routine 144 and, like the decrease gear routine 142, the increase gear routine 144 is a relatively straightforward routine for derailing the chain 14 and stepping up the gears.

Figure 13:
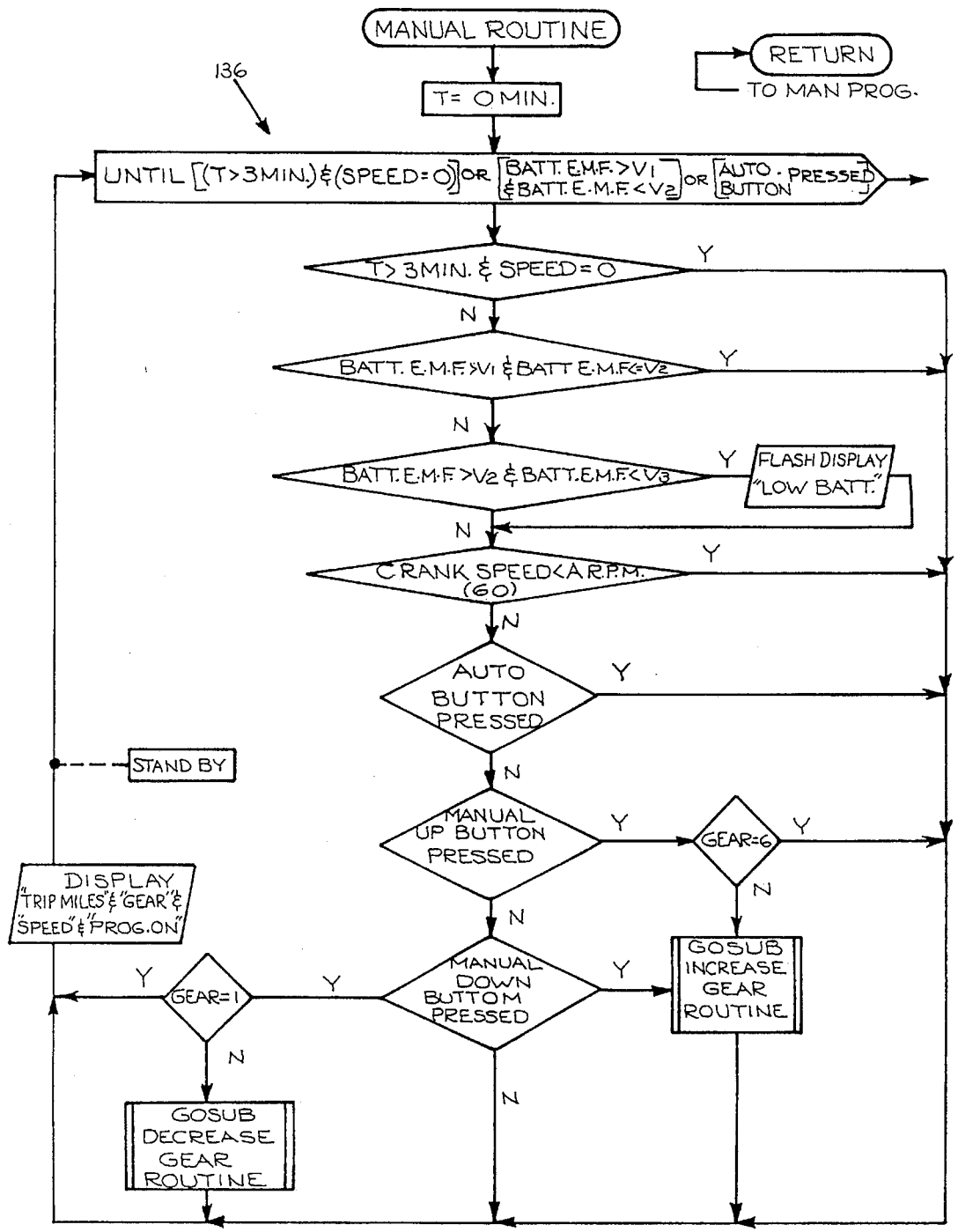
FIG. 13 is a flow chart of the manual routine for use by the automatic gear changing system.

FIG. 13 illustrates the manual routine 136 which is the program which overrides the auto routine 134 and the automatic gear shifting of the bicycle 12 so that the rider can directly shift gears by simply pressing either the manual override up or down switch 52 and 54 on the secondary console unit 50. An initial loop control determines whether the rider returns to the main program 132 from the manual routine 136 or whether the body of the manual routine 136 is executed. Like the main program 132 and the auto routine 134, the manual routine 136 contains a sequence of steps for monitoring battery e.m.f. before the sequence of steps for actually initiating gear shifting are executed. Furthermore, like the auto routine 134, the manual routine 136 calls either the increase gear routine 144 or the decrease gear routine 142 to actually initiate, control, and terminate gear shifting.

Figure 17:
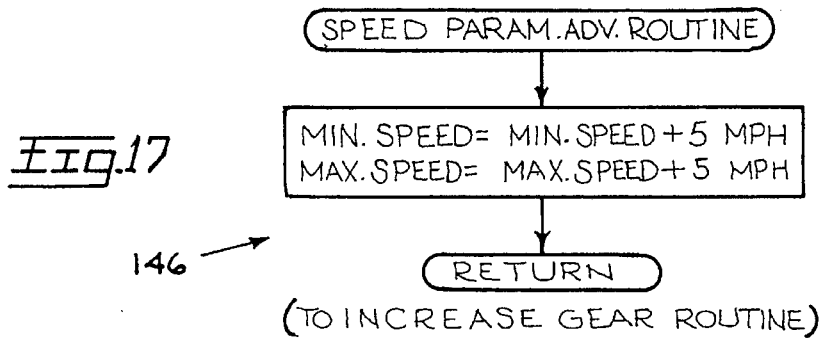
FIG. 17 is a flow chart of the speed parameter advance routine for use by the automatic gear changing system.
Figure 18:
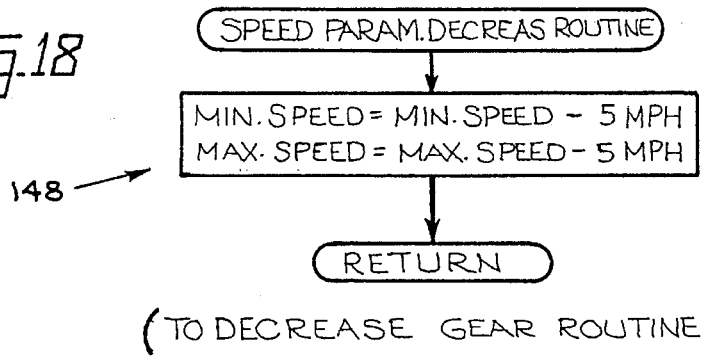
FIG. 18 is a flow chart of the speed parameter decrease routine for use by the automatic gear changing system.

FIGS. 17 and 18 illustrate, respectively, the speed parameter advance routine 146 and the speed parameter decrease routine 148. The increase gear routine 144 calls the speed parameter advance routine 146 and the decrease gear routine 142 calls the speed parameter decrease routine 148. The speed parameter advance routine 146 and speed parameter decrease routine 148 are short programs to either increment or decrement speed from a maximum speed parameter or a minimum speed parameter.

Figure 14:
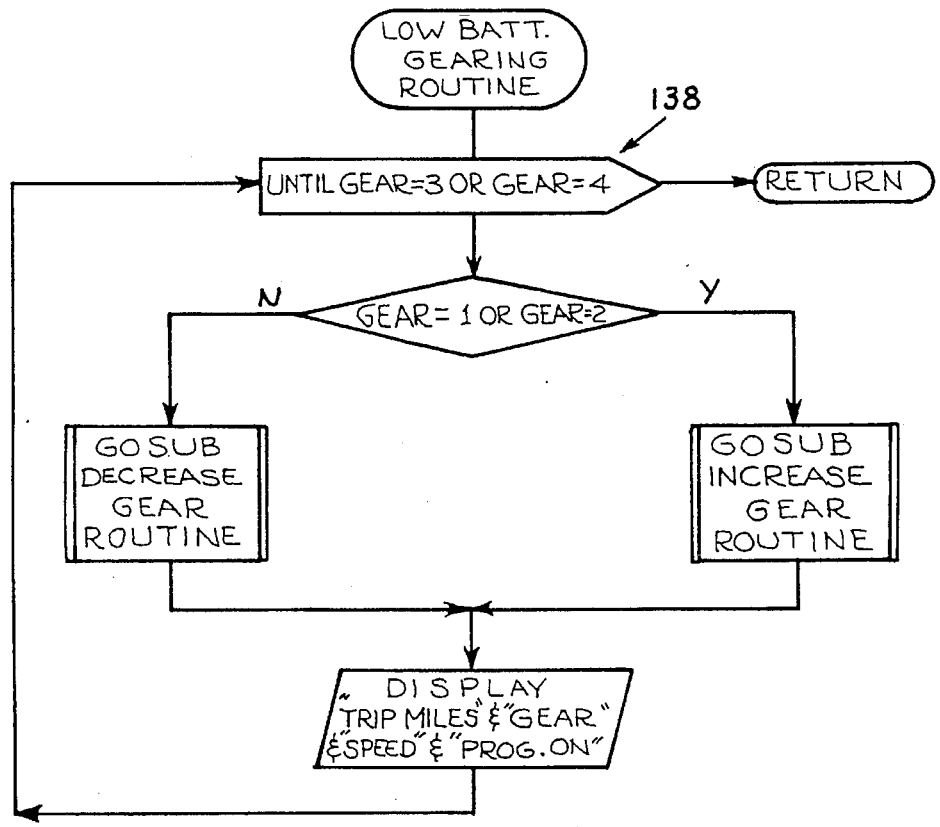
FIG. 14 is a flow chart of the low battery gearing routine for use by the automatic gear changing system.

Illustrated in FIG. 14 is the low battery gearing routine 138. The low battery gear routine 138 is called from the main program 132 and is designed to immediately inform the rider via the console display 46 that the battery charge is declining. The low battery gearing routine 138 permits the system 10 to derail the chain 14 to the third or fourth gear, which are the middle gears on a six-speed bicycle. Thus, if the rider is in first or second gear, or fifth or sixth gear, by calling either the increase or the decrease gear 142 and 144 routine when the battery charge is declining as monitored by the mpu 48, chain derailment is kept to a minimum to reach the middle gears.

Although a certain preferred embodiment has been shown and described in detail, it should be understood that various changes and modifications may be made therein without departing from the scope of the appended claims.

I claim:

1. In combination with a multi-speed bicycle having at least one front chain wheel, a plurality of rear transmission sprockets, an endless chain trained around the front chain wheel and one of the plurality of rear transmission sprockets and a gear changing assembly adjacent the rear transmission sprockets and from which a rear derailleur cable extends, an automatic gear changing system for selectively derailing the chain from one rear transmission sprocket to another transmission sprocket, comprising:

a main housing member for mounting to the bicycle;

a selectively actuated drive motor enclosed within the main housing member;

a linear actuator threaded shaft disposed within the main housing member which is selectively actuated by the drive motor for rotational motion therein to mechanically initiate chain derailment and transmission gear changing;

a linear actuator stub mounted to the linear actuator threaded shaft so that the selective rotatable motion of the linear actuator threaded shaft engages the linear actuator stub and causes a predetermined linear reciprocable movement of the linear actuator stub within the main housing member;

cable attachment means for attaching the rear derailleur cable to the linear actuator stub;

position indicating means circumjacent a portion of the linear actuator threaded shaft and the linear actuator stub and in which discrete voltage changes are induced by the linear movement of the linear actuator stub interacting with the electromagnetic field of the position indicating means whereby output signals are produced corresponding to the discrete voltage changes; and a microprocessor mounted to the bicycle for monitoring the amount of power available to the drive motor and for evaluating the output signals produced by the position indicating means in order to initiate, control, and terminate the automatic derailing of the chain from one rear transmission sprocket to another rear transmission sprocket so that automatic gear shifting occurs.

2. The automatic gear changing system of claim 1 wherein the position indicating means includes an inductance coil embedded within the main housing member encompassing a portion of the linear actuator threaded shaft and the linear actuator stub so that the linear movement of the linear actuator stub alters the voltage of the inductance coil causing gear position signals which represent the engagement of the chain on each respective rear transmission sprocket to be outputted to the microprocessor.

3. The automatic gear changing system of claim 2 wherein a range of discrete voltages produced by the linear actuator stub interacting with the inductance coil correspond to respective rear transmission sprocket positions.

4. The automatic gear changing system of claim 1 wherein the main housing member includes an upper end, an opposite lower open end, and an inner circular bore extending from the lower open end substantially into, and concentric therewith, the main housing member.

5. The automatic gear changing system of claim 1 wherein the main housing member includes a lateral bore extending through the main housing member adjacent the lower open end and which registers with the inner circular bore.

6. The automatic gear changing system of claim 1 wherein the linear actuator stub will always encompass a portion of the linear actuator threaded shaft throughout the range of linear reciprocal movement of the linear actuator stub when the stub is actuated by the shaft.

7. The automatic gear changing system of claim 1 wherein the linear actuator stub includes an annularly threaded stub bore extending therethrough and which is threadably engaged by the linear actuator threaded shaft so that continuous rotatable motion of the linear actuator threaded shaft causes reciprocable linear movement of the linear actuator stub on the shaft.

8. The automatic gear changing system of claim 1 wherein the linear actuator stub includes a longitudinal slot formed on the surface of the linear actuator stub.

9. The automatic gear changing system of claim 1 further comprising an anti-rotation means for preventing the rotatable movement of the linear actuator stub within the main housing member when the linear actuator stub is engaged by the linear actuator threaded shaft for transmission gear shifting.

10. The automatic gear changing system of claim 9 wherein the anti-rotation means includes an anti-rotation screw inserted through the lateral bore of the main housing member for insertion into the longitudinal slot of the linear actuator stub so that rotation of the linear actuator stub is prevented when it is engaged by the linear actuator threaded shaft for rear transmission sprocket shifting.

11. The automatic gear changing system of claim 1 wherein the cable connection means includes a multi-jaw chuck for gripping an end of the rear derailleur cable and which is inserted into the stub bore adjacent the lower open end of the main housing member and which travels within the inner circular bore of the main housing member concomitant with the linear movement of the linear actuator stub.

12. The automatic gear changing system of claim 1 wherein the linear actuator threaded shaft, the linear actuator stub, and the multi-jaw chuck are disposed in axial alignment within the inner circular bore of the main housing member.

13. The automatic gear changing system of claim 1 further comprising a means for sensing the angular velocity of the front wheel and transmitting that velocity to the microprocessor for interpretation and evaluation.

14. The automatic gear changing system of claim 1 further comprising a means for sensing the angular velocity of the rear wheel and transmitting that velocity to the microprocessor for interpretation and evaluation.

15. In combination with a multi-speed bicycle having a plurality of front chain wheels, a plurality of rear transmission sprockets, an endless chain trained around the front chain wheels and the rear transmission sprockets, a gear changing assembly adjacent the rear transmission sprockets, a front gear changing assembly adjacent the front chain wheels and from which a front derailleur cable extends, an automatic gear changing system for selectively derailing the chain from one rear transmission sprocket to another transmission sprocket and from one chain wheel to another chain wheel, comprising:

a second housing member for mounting to the bicycle;

a selectively actuated drive motor enclosed within the second housing member;

a linear actuator threaded shaft disposed within the second housing member which is selectively actuated by the drive motor for rotational motion therein to mechanically initiate chain derailment from one front chain wheel to an adjacent front chain wheel for front gear changing;

a linear actuator stub mounted to the linear actuator threaded shaft so that the selective rotatable motion of the linear actuator threaded shaft engages the linear actuator stub and causes a predetermined linear reciprocable movement of the linear actuator stub within the second housing member;

cable attachment means for attaching the front derailleur cable to the linear actuator stub;

position indicating means circumjacent a portion of the linear actuator threaded shaft and the linear actuator stub and in which discrete voltage changes are induced by the linear movement of the linear actuator stub interacting with the electromagnetic field of the position indicating means whereby output signals are produced corresponding to the discrete voltage changes; and a microprocessor mounted to the bicycle for monitoring the amount of power available to the drive motor and for evaluating the output signals produced by the position indicating means in order to initiate, control, and terminate the automatic derailing of the chain from one front chain wheel to another front chain wheel so that automatic front gear shifting occurs.

\* \* \* \* \*